2 Sheets—Sheet 1.
J. F. APPLEBY.
GRAIN BINDER.
No. 255,712. Patented Mar. 28, 1882.
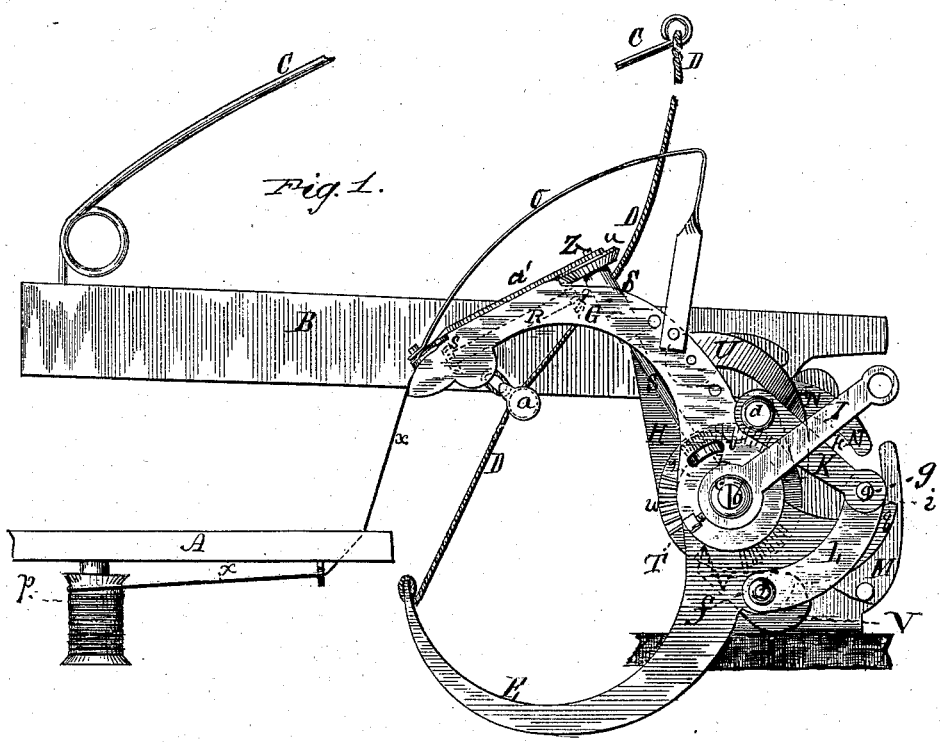
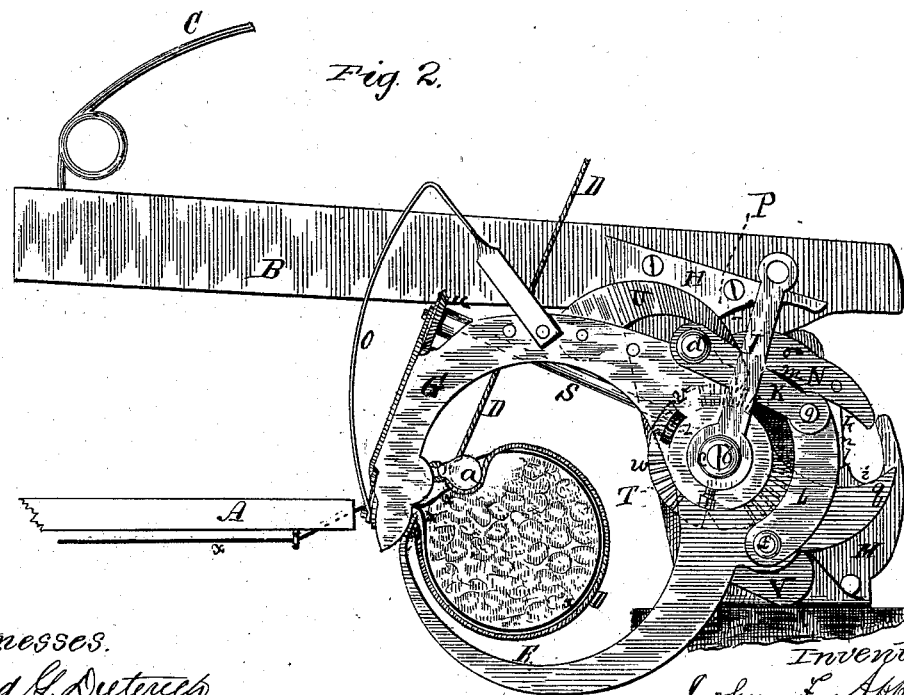
Witnesses.
Fred G. Dieterich
T. C. Day
Inventor
John F. Appleby,
J. S. Brown,
his atty.
N. PETERS, Photo-Lithographer, Washington, D. C.

2 Sheets—Sheet 2.
J. F. APPLEBY.
GRAIN BINDER.
No. 255,712.  Patented Mar. 28, 1882.
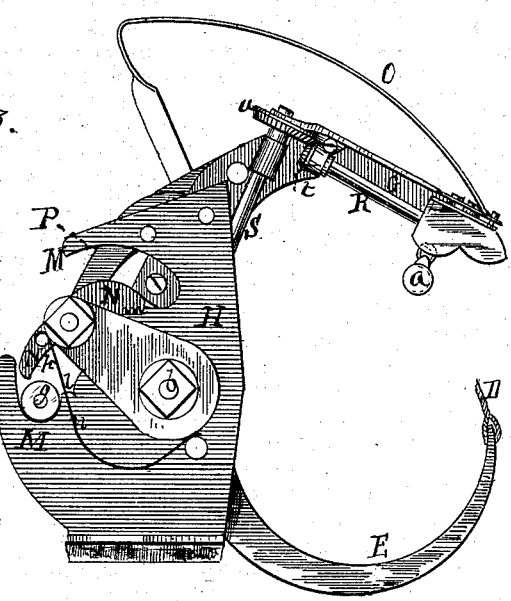
Fig. 3.
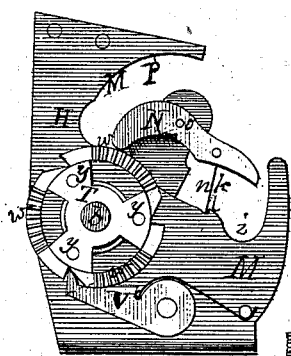
Fig. 4.
Fig. 5.
Fig. 9.
Fig. 6.
Fig. 7.
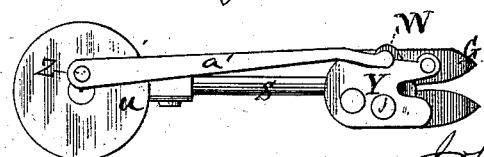
Fig. 8.
Witnesses
Fred L. Dietrich
T. C. Day
Inventor
John F. Appleby
by J. S. Brown
his atty.

UNITED STATES PATENT OFFICE.

JOHN F. APPLEBY, OF BELOIT, WISCONSIN, ASSIGNOR TO THE MINNEAPOLIS HARVESTER WORKS, OF MINNESOTA.

GRAIN-BINDER.

SPECIFICATION forming part of Letters Patent No. 255,712, dated March 28, 1882.

Application filed January 2, 1880.

*To all whom it may concern:*

Be it known that I, JOHN F. APPLEBY, of Beloit, in the county of Rock and State of Wisconsin, have invented certain new and useful Improvements in Self-Binding Mechanisms of Harvesters; and I do hereby declare the following to be a full, clear, and exact description thereof, reference being had to the accompanying drawings, forming part of this specification, and to the letters of reference marked thereon.

Figure 1 is a side view, showing my improved binding mechanism in the condition in which it would appear with the parts in position for the reception of the grain to be bound. Fig. 2 is a similar view, but with the parts in the positions in which they would be when a gavel shall have been compressed and encircled by the binding-wire. Fig. 3 is a side view with the parts in the same relative positions as exhibited in Fig. 1, but taken from a different point of view to show the opposite side of the machine. Fig. 4 is a side view of the supporting or main plate of the mechanism and certain of its parts detached and viewed from the same point as that from which Fig. 1 is taken. Figs. 5, 6, 7, 8, and 9 are detail views of certain parts and groups of parts detached for purpose of clearer illustration of the details of construction of the mechanism.

In general plan of construction and operation the self-binder shown will be found to resemble closely the machine shown and described in United States Letters Patent granted to me December 28, 1875, No. 171,465. No means are shown for feeding the cut grain from the platform to the binding device; but it may be understood that a raking device similar to that shown in my said patent is designed to be used in connection with the improved machine herein shown and described.

It will be observed, to start with, that in my present machine the devices for twisting the wire are all mounted on the upper one of the binding-arms, and derive their movements by reason of the motions of said arm, and that this peculiarity necessarily leads to the main differences in structure between my present mechanism and that shown in my said Letters Patent.

In the drawings, A represents part of the grain-platform of a harvester, from the surface of which the cut or fallen grain is swept or raked to the binding mechanism.

B represents a fixed bar (or bars) arranged over the platform A, as shown, and serving to confine the mass of grain downward on the platform.

G and E are respectively the upper and lower binding-arms, between which the gavel is collected and bound into a sheaf, and each of which is pivoted, as shown, at its inner end to a common axis or shaft, $b$, which is secured to the stationary stand or body portion H of the binder. The upper arm, G, carries the twisting and cutting devices and has a vibratory motion about its axis or shaft $b$, which it derives positively from some revolving part of the harvester—as, for instance, the reel-shaft— through the medium of an arm, I, secured at one end to the hub or sleeve $c$ of said arm G, and coupled at its other end by a connecting-rod (not shown) to said revolving part of the harvester. The arm I is secured to the hub $c$ by means of a set-screw, so that it may be adjusted to and secured in any proper position relatively to the arm G to effect by its vibrations the desired vibratory movements of said arm G.

On a pivot, $d$, projecting from the arm G at a proper point, one end of a bar, K, is pivoted; and on a pivot, $f$, attached to the lower arm, E, at a proper point, as represented, one end of another bar, L, is pivoted, the other ends of said bars being pivoted together by a pin, $g$. This pin $g$ projects at one end and forms a guide-stud, to be directed in its movements by the combined actions of a stationary cam, M, and a swinging cam, N, both of which are more clearly represented in Fig. 4. The conjoint operations of these cams and the said pivoted bars K and L may be thus explained: Supposing the arms G and E to be in the positions represented in Fig. 1, ready to receive a gavel of grain for binding, and the guide-stud $g$ to be at the point $i$ in the bottom of the cam M, the upper arm, G, will then be in its highest position, and its next movement will be downward, and that of its bar-pivot $d$ upward, thereby lifting the connecting-bar K and drawing the said cam-stud $g$ upward and in contact with the face $k$ of the swinging cam N. The said face $k$, as seen in Figs. 1 and 2, being at this time concentric with the pivot $f$ of the connecting-bar L on the lower arm, E, the latter is permitted to remain stationary during this part of the movement—that is, while the upper arm, G, descends and meets the lower arm—thus bringing the cord D and the binding-wire $x$ around the gavel, and bringing the two folds of the wire together, ready for twisting, all as shown in Fig. 2. From this point the upper arm, G, continues to descend still farther, thereby further drawing the connecting-bar K upward and forward until the cam-stud $g$ reaches the upper termination, P, of the cam M. During this part of the movement the cam-stud $g$ rides upon the portion $m$ of the cam N which is concentric with the axis of the arm G, and consequently the lower arm, E, is drawn downward at precisely the same speed as that at which the upper arm, G, descends. Hence the ends of the two arms are kept together in the relative position shown in Fig. 2. It is during the descent thus of the two arms in unison and with their ends together that the wire band is twisted and severed from the body of the wire. Next the upper arm, G, begins to rise, causing the connecting-bar K to retreat; but as the upper end of the swinging cam N was, when the cam-stud $g$ left the portion $m$, forced by a spring, $n$, into the position shown in Fig. 4, the retreat or return of the cam-stud $g$ beneath the said swinging cam N is now prevented, and said stud $g$ is forced to pass outside and on top thereof and against the face P of the cam M. This portion of said cam M being now concentric with the pivot $f$ of the connecting-bar L on the lower arm, E, the latter is consequently again permitted to remain at rest and in a position low enough to allow the bound sheaf to be thrown upon the ground beneath the platform A by the cord D. From the close of this part of the movement, when the cam-stud reaches the upper termination of the cam M, the upper arm, G, continues to ascend, and the cam-stud $g$ at the same time descends outside or on top of the swinging cam N, forcing the lower end of the latter inward and out of its way until said stud $g$ reaches the point $i$ of the cam M again. During this part of the movement the said cam-stud $g$ comes in contact with and pushes against the heel $q$ of the lower arm, E, thereby swinging the said heel downward and the arm itself upward until it again reaches the position just below the platform A shown in Fig. 1.

The upper arm, G, is provided with a guard, O, secured outside thereof and arranged about concentric with its shaft or pivot, $b$, said guard extending upward and backward as far as may be necessary to keep the grain on the platform out of contact with the arm G during the descending and ascending movements. Being concentric with the arc of the arm's motion, this guard, it will be seen, keeps back the grain with but a slight frictional contact therewith during the movements of the said arm. The end of the wire is always held by the wire twisting and holding device in the upper arm, G, while the body of the wire is wound on a spool, $p$, beneath the platform, the position of the wire just before the bringing of a gavel to the binder being shown in Fig. 1. The pressure of the incoming grain against the wire causes it to unwind from the spool and to be bent into the receptacle between the arms E G, in a manner well understood.

The end of the arm G is notched, as shown in the top view, Fig. 8, to receive the wire and lead it to the twister, which, as shown in Figs. 6 and 7, is a notched revolving disk or pinion, $q$, adapted to receive the two folds of the wire in its side notch or radial slit, $r$, and which operates, by a revolving movement of two or three turns, to twist the two folds of the wire together, substantially as described in the Letters Patent hereinbefore referred to. One important feature of the present invention is the mounting of the mechanisms of this twister and of the wire-severing knife upon the arm G itself, and communicating the necessary movements to the said mechanisms through the medium of the movement of the said arm. The mechanism shown consists of a shaft, R, having pinions $s$ and $t$ at its ends, that gear respectively into the pinion-twister and into a miter-wheel, $u$, on another shaft, $s$, arranged as shown. The size of the bevel-pinion $s$ is such as to give the requisite number of revolutions to the twister, while at the same time only one revolution need be given to the shaft S at each twisting of a band. This single revolution of the shaft S is produced periodically by means of a pinion, $v$, Figs. 1 and 2, at the lower end thereof, brought by the descent of the arm G into gear with a rack-wheel or set of gear-teeth, $w$, on a rack-wheel, T, Figs. 1, 2, and 4, which also has an intermittent rotatory movement on the pivot or shaft $b$ of the arm. The construction and co-operative action, with the other devices of this rack-wheel, are peculiar. While the pinion $v$ must make a complete revolution, and as the arm G, on which its shaft is mounted, moves through only a comparatively small arc of a circle, the rack $w$ on the rack-wheel can of course only extend through a correspondingly small part of the entire circle of said wheel, and it is also requisite not only that the said pinion should not gear with the rack during its return or ascending movement, but also that during said return movement, as well as during a portion of each descending movement, it should be prevented from accidentally turning. To fulfill these requisites I form several (three, more or less) racks, $w$ $w$ $w$, at equal distances apart, on the face of the rack-wheel, as shown best in Fig. 4, and the same number of intermediate plane faces, $y$ $y$ $y$, against which faces the face of a delay-shoe, $z$, on the shaft S, Figs. 1, 2, and 9, slides, when the racks and pinion are out of gear, in order to hold the shaft S from turning.

The rack-wheel T has an intermittent movement upward to the right, effected by a pawl, U, pivoted to the arm G, and taking into notches in the edge of said rack-wheel, as shown in Figs. 1 and 2. Any return or movement of the rack-wheel in the opposite direction is prevented by a detent, V, which takes into the same notches. The movement effected by this construction is this: The pinion has one more tooth than each rack $w$, and makes therefore just one revolution in passing over each rack. Thus during the first part of each descending movement of the arm G the delay-shoe $z$ on the pinion-shaft S slides over one of the plane faces $y$, the rack-wheel being at this time held stationary by the detent V. Next the pinion $v$ strikes into the rack $w$, which is in proper position, and in passing down over and in gear with said rack is caused to make one revolution. At the moment when it gets below and out of gear with the said rack the delay-shoe $z$ comes upon the next one of the plane faces $y$ and holds the shaft S from turning. The arm G at that moment reaches its lowest position. Next, the said arm ascends, carrying up the pinion $v$ with it, and also that side of the rack-wheel adjacent to said pinion by the action of the pawl U. The parts are then in position to repeat the movement just described with the succeeding face and rack.

The severing of the wire to detach the band of the bound sheaf is effected by means of a notched knife, W, Figs. 5 and 8, having a swinging movement on a pivot, $j$, between two stationary plates, X Y, which are so situated, as shown in said figures, as to receive the wire just above the twisting-pinion. The movement of the knife W is produced by a crank-pin or eccentric, Z, on the back of the miter-wheel $u$, and a connecting-rod, $a'$, extending therefrom to the said knife. As the miter-wheel $u$ makes just one revolution at each binding of a sheaf, this crank-pin is so arranged as at the proper time to swing the knife downward and cause it to catch the wire in its notch and to again ascend and cut the wire against the edges of the plates X Y. The upward movement of the knife also holds the end of the wire from which the band is cut, jammed, or clamped between it and one of the plates. The upper plate, Y, is elastic, as of spring-steel, to adapt itself to the thickness of the wire. Thus the end of the wire is held secured to the arm G at all times. The crank-pin Z is at the dead-point farthest from the end of the arm when the miter-wheel $u$ is at rest, thus securely retaining the knife in a position to hold the wire.

Having now so fully explained the construction and operation of my improved binder mechanism that those skilled in the art can make and use the same, what I claim therein as new, and desire to secure by Letters Patent, is—

1. In combination with the wire-carrying or needle arm G and the band-twisting or band-fastening mechanism, carried wholly on said arm, the movable device or mechanism which operates when at rest to effect the periodical movements of the band-twisting mechanism, and which is itself operated from the arm G, all substantially as set forth.

2. In combination with the arms G and E, the connecting links or arms K and L, pivoted thereto, as described, and to each other by a pin, $g$, and the means for controlling the direction of movement of the pin $g$, in the manner and for the purpose set forth.

3. The fixed and swinging cams M and N, constructed to operate as specified, in combination with the arms K and L, pin $g$, arms G and E, and heel-piece $q$, whereby all the necessary motions of the arm E are derived from that of the arm G, as set forth.

4. The intermittingly-rotating rack-wheel T, provided with a series of alternately-arranged racks $w$ and plane surfaces $y$, and actuated by the ascent of the arm G, in combination with the pinion $v$, delay-shoe $z$, and shaft S, mounted on said arm, and means for holding said rack-wheel still during the descent of the arm G, as set forth.

5. In combination with the gear-wheel $u$ of the band-twisting mechanism, the band-severing knife W, the connecting-rod $a'$, and crank-pin Z, all arranged and operating substantially in the manner and for the purpose set forth.

The foregoing specification signed by me this 19th day of August, 1879.

JOHN F. APPLEBY.

Witnesses:
 E. J. ROBBINS,
 J. H. JENKS.